(12) United States Patent
Staton et al.

(10) Patent No.: US 10,684,483 B2
(45) Date of Patent: Jun. 16, 2020

(54) ITEM OF HEADWEAR

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 35 days.

(21) Appl. No.: 16/035,097

(22) Filed: Jul. 13, 2018

(65) Prior Publication Data

US 2018/0341114 A1 Nov. 29, 2018

Related U.S. Application Data

(63) Continuation-in-part of application No. PCT/US2017/013802, filed on Jan. 17, 2017.

(60) Provisional application No. 62/329,544, filed on Apr. 29, 2016, provisional application No. 62/281,007, filed on Jan. 20, 2016.

(51) Int. Cl.
| | |
|---|---|
| *G09G 5/00* | (2006.01) |
| *G02B 27/01* | (2006.01) |
| *G09G 3/00* | (2006.01) |
| *A42B 1/20* | (2006.01) |
| *A42B 1/00* | (2006.01) |
| *A42B 1/24* | (2006.01) |

(52) U.S. Cl.
CPC .......... *G02B 27/0176* (2013.01); *A42B 1/006* (2013.01); *A42B 1/203* (2013.01); *A42B 1/205* (2013.01); *A42B 1/241* (2013.01); *G09G 3/001* (2013.01); *G02B 2027/0178* (2013.01); *G09G 3/003* (2013.01); *G09G 2330/02* (2013.01); *G09G 2354/00* (2013.01)

(58) Field of Classification Search
CPC ......... A42B 1/006; A42B 1/203; A42B 1/205; A42B 1/241; G02B 2027/0178; G02B 27/0176; G09G 2330/02; G09G 2354/00; G09G 3/001; G09G 3/003
See application file for complete search history.

(56) References Cited

U.S. PATENT DOCUMENTS

| | | | |
|---|---|---|---|
| 4,277,847 A | 7/1981 | Florio | |
| 4,793,006 A | 12/1988 | Dawson | |
| 6,808,278 B1 | 10/2004 | Jimov | |

(Continued)

FOREIGN PATENT DOCUMENTS

| | | |
|---|---|---|
| CN | 203662092 U | 6/2014 |
| WO | 2015172988 A1 | 11/2015 |

OTHER PUBLICATIONS

PCT Application No. PCT/US2017/013802, International Preliminary Report on Patentability, dated Jul. 26, 2018, 11 pages.

*Primary Examiner* — Insa Sadio
(74) *Attorney, Agent, or Firm* — Avant Law Group, LLC (57) ABSTRACT

Items of headwear are disclosed. An item of headwear has a battery, and an information portal. The information portal includes an input device, a human interface device, and a content providing system. The content providing system has non-transitory computer memory with a program with instructions for receiving information from the input device, and relaying the information to the human interface device. The content providing system further includes a processor, an output device, and a networking device.

18 Claims, 10 Drawing Sheets

(56) References Cited

U.S. PATENT DOCUMENTS

2002/0186180 A1    12/2002   Duda
2007/0064311 A1     3/2007   Park
2008/0023023 A1     1/2008   Boye et al.
2015/0235610 A1*   8/2015   Miller .................. G06T 19/006
                                                                            345/633

\* cited by examiner

ITEM OF HEADWEAR

CROSS-REFERENCE TO RELATED APPLICATIONS

This application is a continuation-in-part of PCT Application No. PCT/US17/13802, filed Jan. 17, 2017, which is pending, and claims priority to U.S. Provisional Patent Application Nos. 62/281,007, filed Jan. 20, 2016; and 62/329,544, filed Apr. 29, 2016. Each of these applications is incorporated by reference herein in their entireties.

BACKGROUND

There are a number of items that persons may carry with them ranging from government-issued identification (e.g., a driver's license or passport, etc.) to currency (e.g., cash, credit/debit cards, etc.) to cell-phones. Often times, these items are carried in a bulky and/or inconvenient container, such as a wallet or purse. While these containers may be fine for everyday use, there may be situations where in which the person prefers to carry only the essentials, and in a means that does not require keeping track of multiple bags, wallets, or other such storage containers. It may be desirable to have a means for storing belongings that is both easily accessible and secure.

Additionally, virtual reality devices are becoming ever more popular. These types of devices may be used for simple entertainment purposes, or may be used for more educational purposes, such as training doctors and nurses in various medical procedures. For whatever purpose that these devices may be used, it is necessary that the device be both comfortable to the wearer and operational. Virtual reality devices to date suffer from significant inconveniences: they are bulky due to the batteries that are required to run the devices, and as a result, are heavy for the wearer, causing the wearer to have to use his or her arms to support the device. It may be desirable, therefore, to have a device which may allow for a more comfortable experience by the user without compromising the virtual reality experience.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, an item of headwear a headband with an inflatable bladder, a battery, and an information portal. The information portal has an input device, a human interface device, and a content providing system. The content providing system includes non-transitory computer memory having a program with instructions for receiving information from the input device, and relaying the information to the human interface device. The content providing system further includes a processor, an output device, and a networking device.

In another embodiment an item of headwear has a battery, and an information portal. The information portal includes an input device, a human interface device, and a content providing system. The content providing system has non-transitory computer memory with a program with instructions for receiving information from the input device, and relaying the information to the human interface device. The content providing system further includes a processor, an output device, and a networking device.

In still another embodiment, an item of headwear has a headband, and an inflatable bladder. The inflatable bladder is secured adjacent a side of the headband closet to a user's head when worn. In a non-use configuration, the bladder lays substantially flat against the headband; and in a use configuration, the bladder inflates to form a soft surface to support a user's head when worn around the user's neck.

In a further embodiment, an item of headwear includes a hat having a crown; and a self-inflatable bladder secured to the crown. A sensor is secured to the hat. The hat further includes a memory storing computer-readable instructions; and a processor configured to execute instructions to: (a) obtain a reading from the sensor; and (b) inflate the self-inflatable bladder upon determining that the reading from the sensor reached a predetermined threshold.

According to still yet another embodiment, an item of headwear has a hat worn by a user; a sensor secured to the hat; a memory storing computer-readable instructions; and; a processor configured to execute instructions to: (a) obtain a reading from the sensor; and (b) communicate a message to a mobile device in response to the reading.

In another embodiment, an item of headwear, comprising a headband, and an inflatable bladder, where the inflatable bladder is secured adjacent a side of the headband closet to a user's head when worn. The item of headwear also includes an information portal comprising an input device, a human interface device, and a content providing system. The content providing system comprises non-transitory computer memory having a program with instructions for: receiving information from the input device; and relaying the information to the human interface device. The content providing system further includes a processor; an output device; and a networking device.

WRITTEN DESCRIPTION

There are many different types of headwear, and the selection of the type of headwear is often based on considerations related to the environment (e.g., hot or cold, sunny or dark/gloomy, etc.), fashion (e.g., selecting an item of headwear that is "in style" or fits with the style of the outfit), or simply personal preference, among others. Baseball-style hats (including visors, as well as other bill-containing hats) are very popular, especially in the United States and Europe. In 2016, nearly 44 million baseball hats were sold in the U.S. alone, equating to over 2 billion dollars in industry revenue. Baseball hats can project a wearer's certain preferences (e.g., brand, favorite team, etc.) as well as be very functional. For example, the bill on a baseball hat may protect the wearer's eyes from the sun; the crown portion may similarly protect the wearer's head. Some baseball-style hats may have ear flaps which can optionally be lowered over the ears from a stored position in cold weather.

Further to the many benefits already enjoyed by wearers of baseball-style hats, as will be described herein, the hat may be configured for additional functional purposes. Accordingly, embodiments of headwear specially adapted for uses beyond traditional protection from the elements are described herein.

While reference is made herein to specific types of hats, such as visors and baseball caps, it shall be understood that these references are exemplary in nature only, and that other types of hats may additionally incorporate one or more of the components and improvements described herein.

Figure 1:
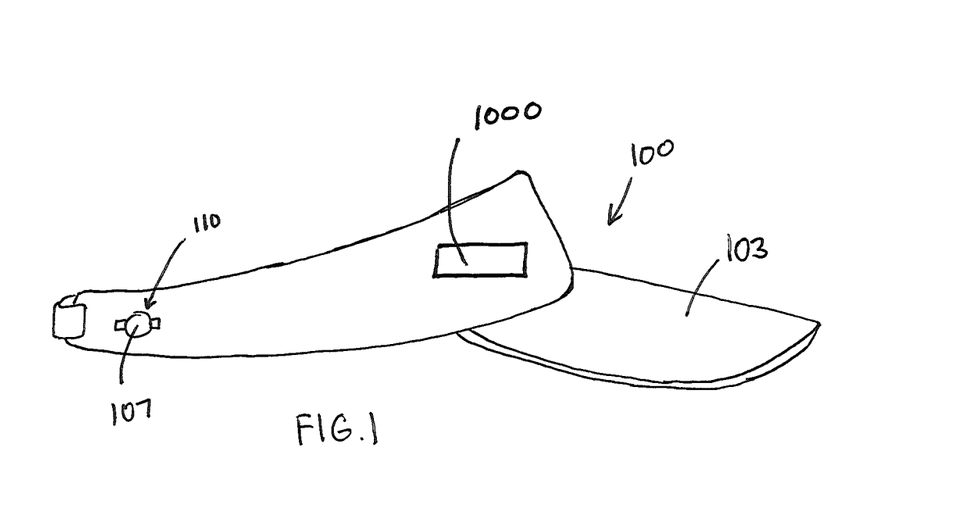
FIG. 1 is a side view of an inflatable item of headwear according to one embodiment of the invention.
Figure 2:
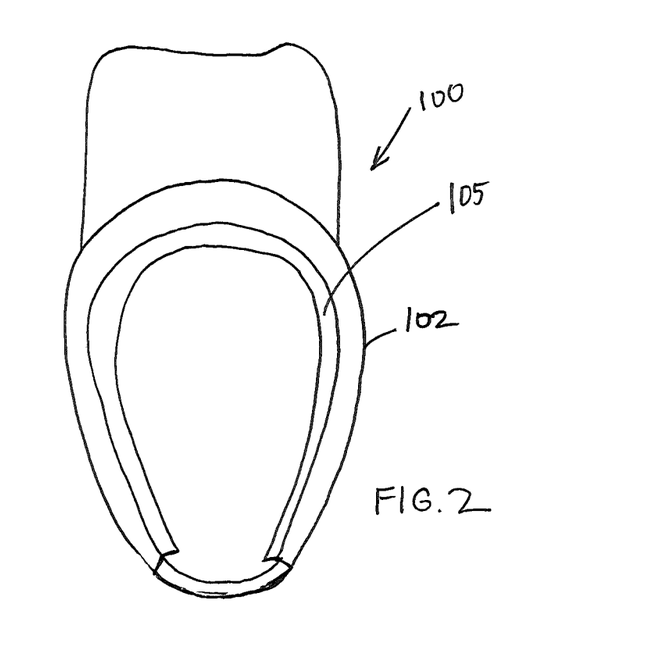
FIG. 2 is a bottom view of the inflatable item of headwear of FIG. 1.
Figure 3:
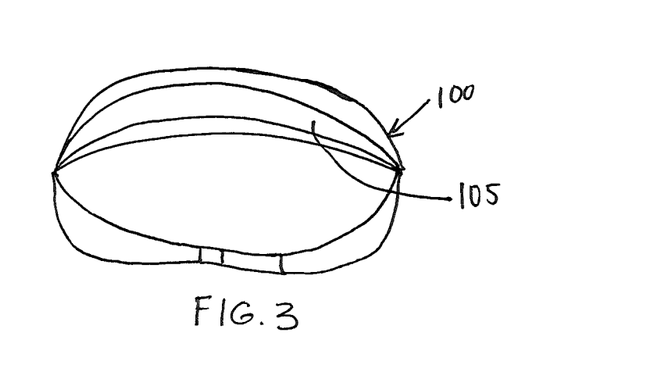
FIG. 3 is a back view of the inflatable item of headwear of FIG. 1.

In one embodiment, an item of headwear is adaptable for use as an inflatable device such as a pillow. Referring now to FIGS. 1-3, an item of headwear (in this case, a visor 100) is equipped with an inflatable bladder 105 for holding air. The bladder may be secured to the strap 102 of the visor 100. In one embodiment, the bladder 105 may be temporarily secured to the strap 102 by employing respective Velcro® pieces on the bladder 105 and the strap 102, for example. Alternately, the bladder 105 may be permanently adhered to the strap 102, for example, by sewing a panel of the bladder 105 to the strap 102, or using an adhesive to secure the respective pieces 102 and 105 together. Other methods of adhesion may additionally or alternately be used.

An aperture 110 may be formed in the strap 102 at a location corresponding with a valve 107 in the bladder 105. The valve 107 may be any appropriate valve now in use or later developed which is configured to both allow a volume of air into the bladder 105, substantially maintain the volume for an acceptable period of time (e.g., 24 hours, 36 hours, etc.), and to subsequently allow air to exit the bladder 105. During production (or at any time when the bladder 105 is secured to the visor 100), the valve 107 may be inserted through the aperture 110 such that it is accessible by the wearer. To inflate the bladder 105, the valve 107 may be opened by the wearer, who may then blow or otherwise provide air into the valve 107 to inflate the bladder 105 to the desirable hardness (e.g., more air increases the hardness of the pillow, while less air leads to a softer pillow). The valve 107 may then be closed to prevent air from leaking out of the bladder 105. In embodiments, the bladder 105 may be configured to self-inflate. Therefore, a pump may be provided at the valve 107 which, when activated, may pull in air from the wearer's surroundings to inflate the bladder 105. Electronics, such as those described herein, may be located at or near the item of headwear for operation of the pump.

When the bladder 105 is inflated, it may be worn around the wearer's neck similar to conventional neck pillows. To deflate the bladder 105, the valve 107 is again opened, and air is then allowed to deflate.

Figure 7:
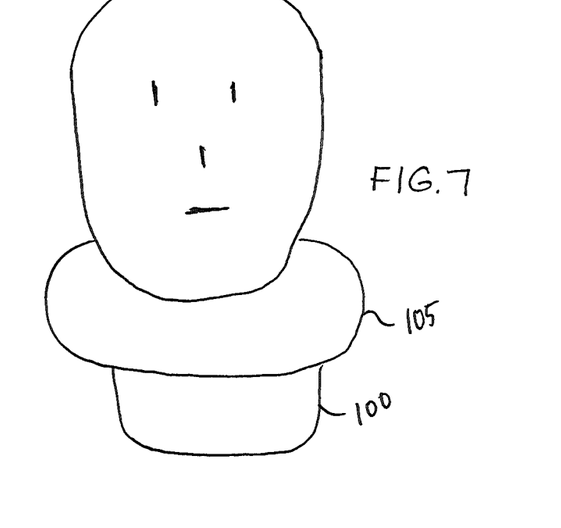
FIG. 7 is a front view of an inflatable item of headwear in use as a headrest.
Figure 8:
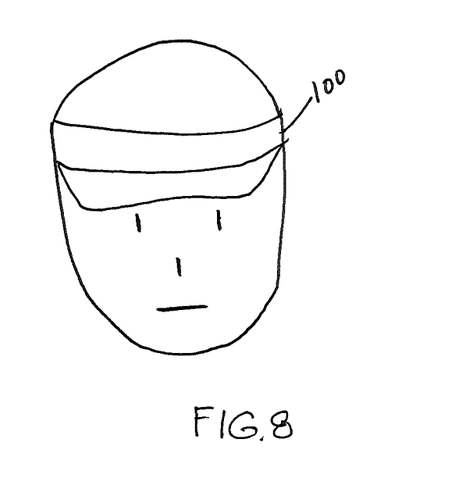
FIG. 8 is a front view of an inflatable item of headwear in use as a head cover.

The bladder 105 may be configured to lay generally flat against the wearer's head when in a deflated state. Accordingly, the bladder 105 may be provided in an accumulated accordion-like folded configuration. When the bladder 105 is inflated, it may expand based on the volume of air provided to the bladder 105. As the bladder 105 is deflated, it may return to its accumulated accordion-like configuration so that the visor 100 may again be comfortably worn. FIGS. 7 and 8 show a visor 100 in use as a pillow and as an item of headwear, respectively. It shall be further understood that the inflatable bladder may have applications beyond simple pillows. For example, the bladder may function as a therapeutic pressure device which may be configured to provide pressure to various regions of the wearer's head (e.g., forehead and temple) to relieve migraines, sinus headaches, etc.

It shall be understood that it may be desirable, when in the folded configuration, for the bladder 105 to have a minimal thickness such that the bladder 105 is virtually invisible when worn (see FIGS. 3 and 8). The bladder 105 may be equipped with a fold line to allow the bladder to snap between the folded and unfolded positions to as to prevent the bladder 105 from slipping out of its folded position.

In one embodiment, the portion of the bladder 105 that faces the wearer's head in a deflated configuration may be covered in a textile such as cotton, a moisture-wicking material, or any other appropriate textile. In another embodiment, the entire bladder may be covered in a textile.

In some embodiments, a bill portion 103 of the visor 100 may be removable from the strap 102.

The inflatable bladder may alternately, or additionally, take the form of an accessory to the hat, for example, a chin strap, ear covers, or other accessory. The accessory may be selectively inflatable to, for example, providing protection from impacts. As is described herein, the item of headwear may be equipped with electronics for allowing the inflatable bladder to automatically inflate upon a determination of an eminent event, such as a fall (e.g., via an accelerometer or other sensor).

Figure 4:
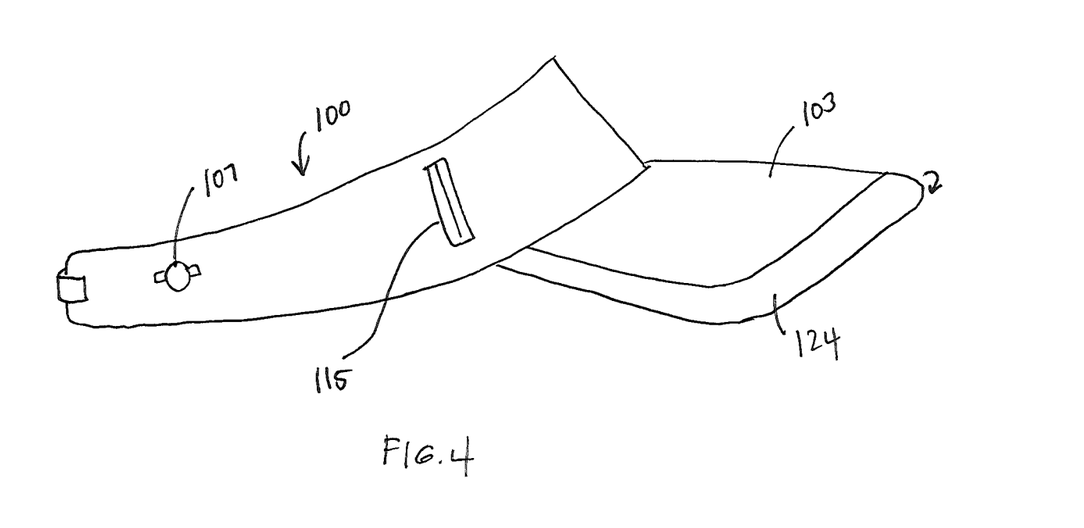
FIG. 4 is a side view of an inflatable item of headwear having a pocket formed therein according to another embodiment of the invention.
Figure 5:
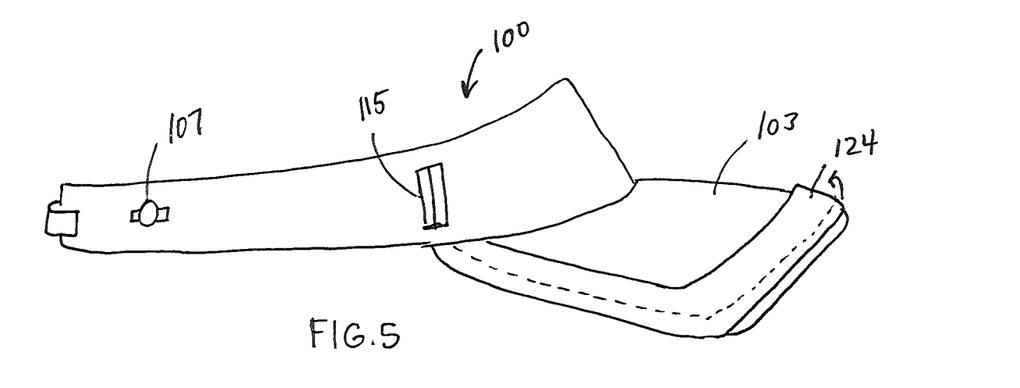
FIG. 5 is side view of the inflatable item of headwear of FIG. 4 with the pocket in an open position.

In another embodiment, an item of headwear may be configured to hold, for example, personal devices such as mp3 players, iPods®, etc. The personal devices may be stored in, for example, a pocket 115 formed into the crown of the hat or into straps 102 on a visor, such as shown in FIGS. 4 and 5. The visor 100 may additionally be equipped with speakers for playing the music. Alternately, the item of headwear may be equipped with structure for storing media files in memory (such as music) and programming, the programming being operable to play the stored media files. The memory may be stored on, for example, SD cards which may be received into an input channel in the item of headwear. The item of headwear may thus be further equipped with a port for receiving a plug for headphones for listening to the stored medial files.

Figure 6:
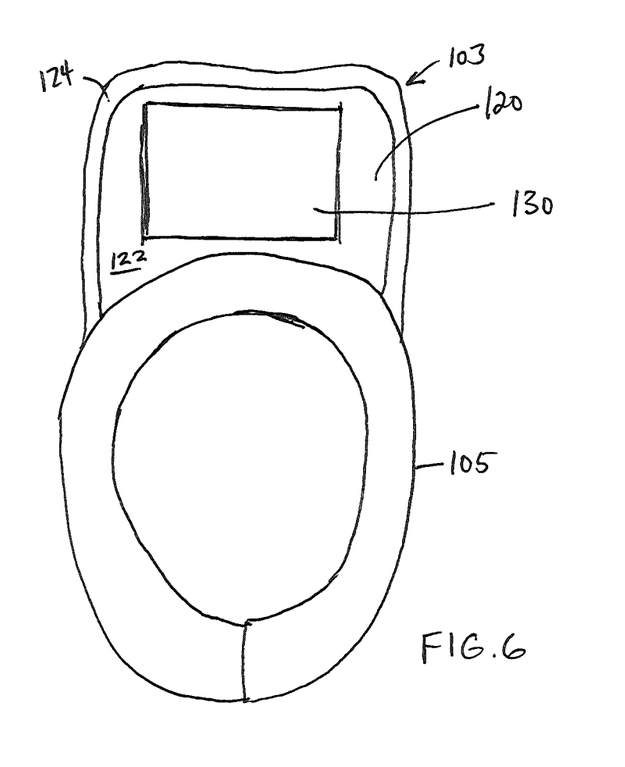
FIG. 6 is a bottom view of the inflatable visor of FIG. 4.

Referring now to FIGS. 4-6, in another embodiment, the item of headwear 100 may have a pocket 120 for holding personal items 130, such as a passport, driver's license, money, etc. The pocket 120 may be located at either or both of the top side and the bottom side of a bill 103. The pocket 120 may comprise a panel of material 122 shaped to generally correspond to the shape of a bill 103, and an elastic band 124. The panel 122 may be formed from a flexible plastic (such as polycarbonate, ABS, thermoplastic polyurethane, etc.), waterproof and tear-proof paper, molded plastic, or any other appropriate material. In some embodiments, it may be desirable for the pocket 120 to be generally indistinguishable from the material on the top of the bill 103. Accordingly, the panel 122 may be formed of a cloth material. Alternately, the panel 122 may be covered in a cloth material resembling the look of the bill 103 of the item of headwear 100.

The elastic band 124 may be secured along three of the four edges of the panel 122 corresponding to the sides and the front of the bill 103 (see FIG. 4). The elastic band 124 may be adhered, molded, or otherwise attached to the panel 122. To secure the panel 122 to the hat 100 to form the pocket 120, the side of the panel 122 without the elastic band 124 may aligned with a backside of the bill 103 (e.g., the side closest to the wearer's head), for example as shown in FIG. 6. As illustrated in FIG. 4, the elastic band 124 may then be folded over the edge of the bill 103 to secure the panel 122 to the hat 100. It may be desirable for the panel 122 to be approximately the same size as the bill 103 of the hat. The backside of the pocket 120 may thus be open to allow for insertion and removal of personal effects.

In another embodiment, the panel 122 may be pre-adhered to the bill 103 (e.g., at a backside of the bill). Here, the elastic band 124 may be folded over the edge of the bill 103 in the same manner as described above. However, to open the pocket 120, the elastic band 124 may be folded away from the edge of the bill 103 (FIG. 5), and personal effects may then be inserted into the pocket 120. To close the pocket 120, the elastic band 124 may be folded back over the edge of the bill 103 to prevent items from falling out of the pocket 120. The pocket 120 may be substantially similar in size to the bill 103 of the hat, as described above. However, it may be desirable for the pocket 120 to be slightly larger such that items having a greater volume can be carried in the pocket (e.g., cellphone, mp3 player, etc.) Therefore, the panel 122 may be slightly larger in size, but substantially shaped the same as, the bill 103.

Figure 9:
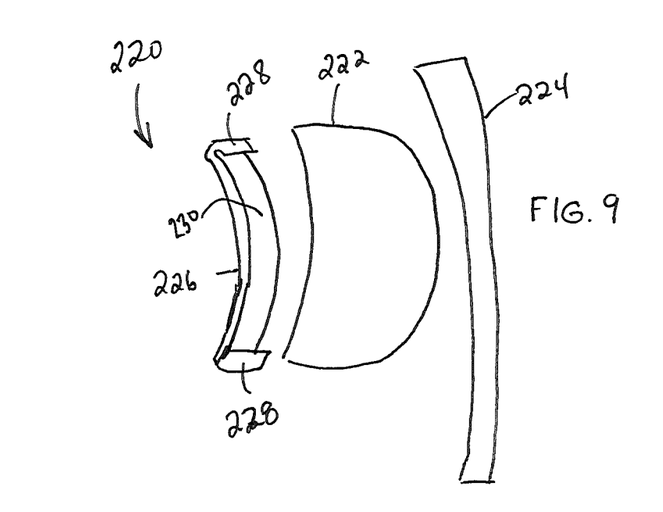
FIG. 9 is a blown up view of the components of a hat pocket for an item of headwear according to another embodiment of the invention.
Figure 10:
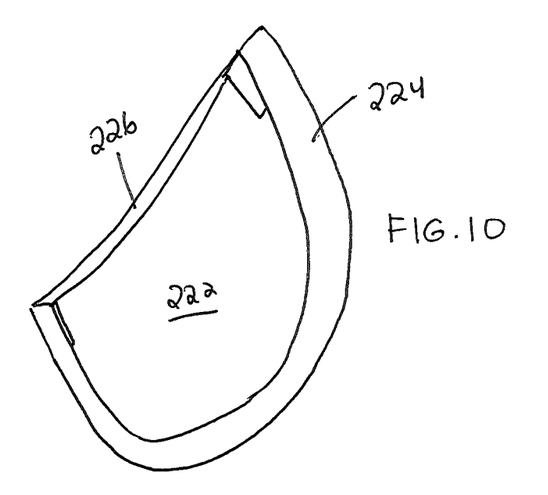
FIG. 10 is a top perspective view of the hat pocket of FIG. 9.

In still another embodiment, illustrated in FIGS. 9-10, a pocket 220 may include an attachment element 226, a panel portion 222, and an elastic band 224. The panel portion 222 and the elastic band 224 may be substantially similar as the panel portion 122 and elastic band 124 described above. The attachment element 226 may be configured as a hook which may fit around a portion of the side(s) of the bill 103 of an item of headwear 100. In one embodiment, the attachment element 226 has clips 228 on the respective ends of the attachment element 226. While the attachment element 226 may take a variety of configurations, in one embodiment, the attachment element may be injection molded from a flexible plastic surrounding a wire. The plastic is flexible such that it can be bent to match the shape of the bill 103 of the cap 100, and the wire may allow the attachment element 226 to hold the desirable shape. However, it shall be understood that the wire is not required, and that the attachment element 226 may simply take the shape of the bill 103 when engaged with the bill 103 of a hat 100.

The panel 222 may be attached to an edge 226 (e.g., an upper edge 230) of the attachment element 226. The panel 222 may be glued, sewn, or otherwise secured to the attachment element 226. The elastic band 224 may be secured to respective top faces of the clips 228 and extended around the edge of the panel 222 (FIG. 10). It may be desirable for the elastic band 224 to be wide enough to completely conceal the respective top faces of the clips 228.

The elastic band 224 may be glued, sewn, or otherwise secured to the attachment element 226.

In use, the pocket 220 may be slid onto the bill 103 of the hat 100 such that the clips 228 engage either side of the bill 103, the band 224 stretches around the edge of the bill 103, and the panel 222 is either above or below the bill 103. To move the pocket 220 from an open to a closed position, the elastic band 224 may be moved over and around the edge of the bill 103 of the hat 100, as described above. When in a closed position, the pocket 220 is virtually inaccessible. To access the pocket 220, a portion of the elastic band 224 may be pulled away from the edge of the bill 103 of the hat 100. The pocket portion 222 may be pulled away from (e.g., in a downwards motion) the bill 103 of the hat 100. Items may then be inserted between the pocket panel 222 and the bill 103, and the pocket 220 returned to the closed position.

The pocket 220 may be easily removed from the hat 100 by simply pulling the elastic band 224 off of the bill 103 of the hat 100, and sliding the attachment element 226 (e.g., vis-a-vis the clips 228) off the bill 103. The pocket 220 may thus be configured for attachment on existing hats 100.

Figure 11:
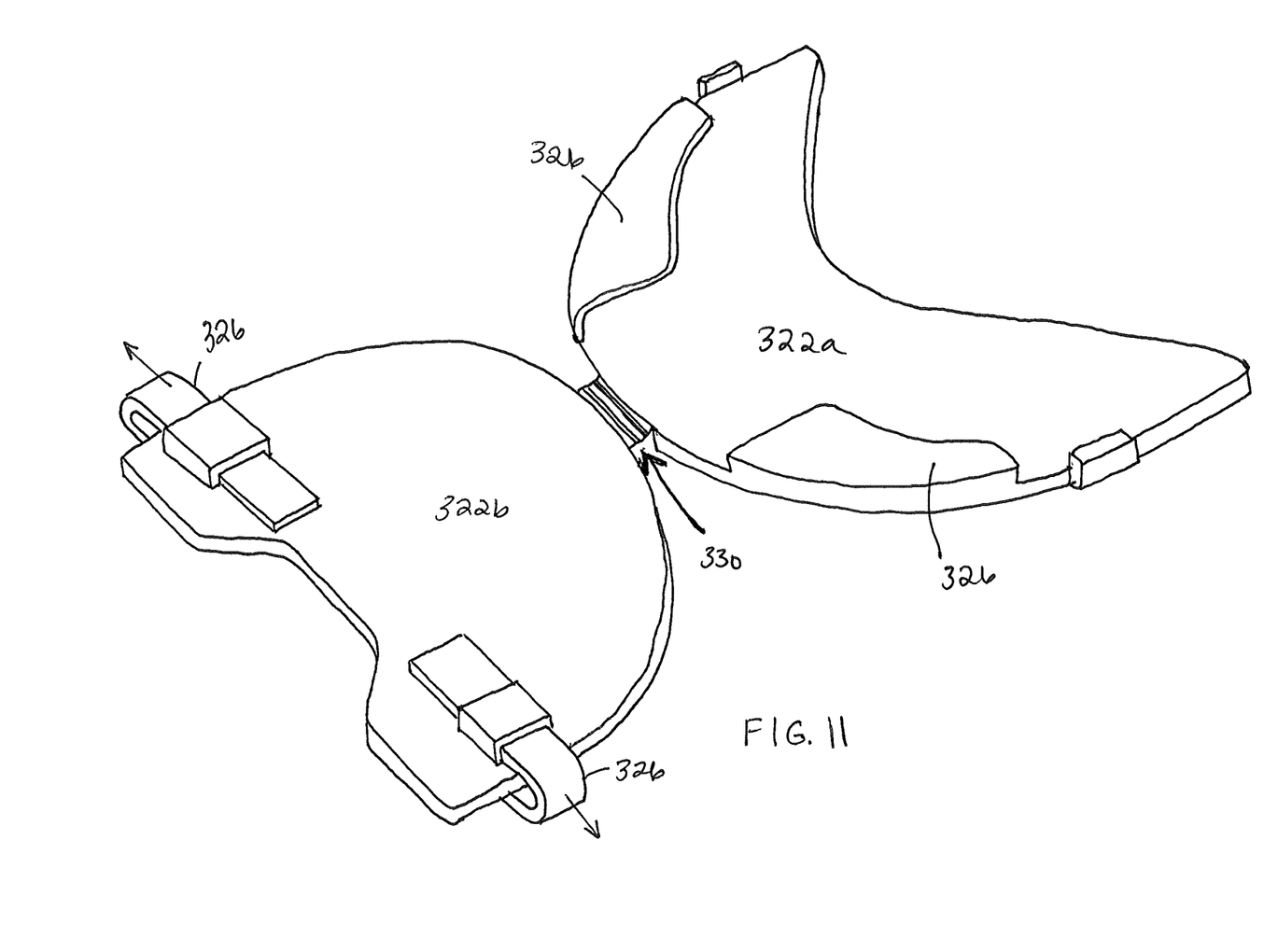
FIG. 11 is a top view of a hat pocket for an item of headwear according to still another embodiment of the invention.
Figure 12:
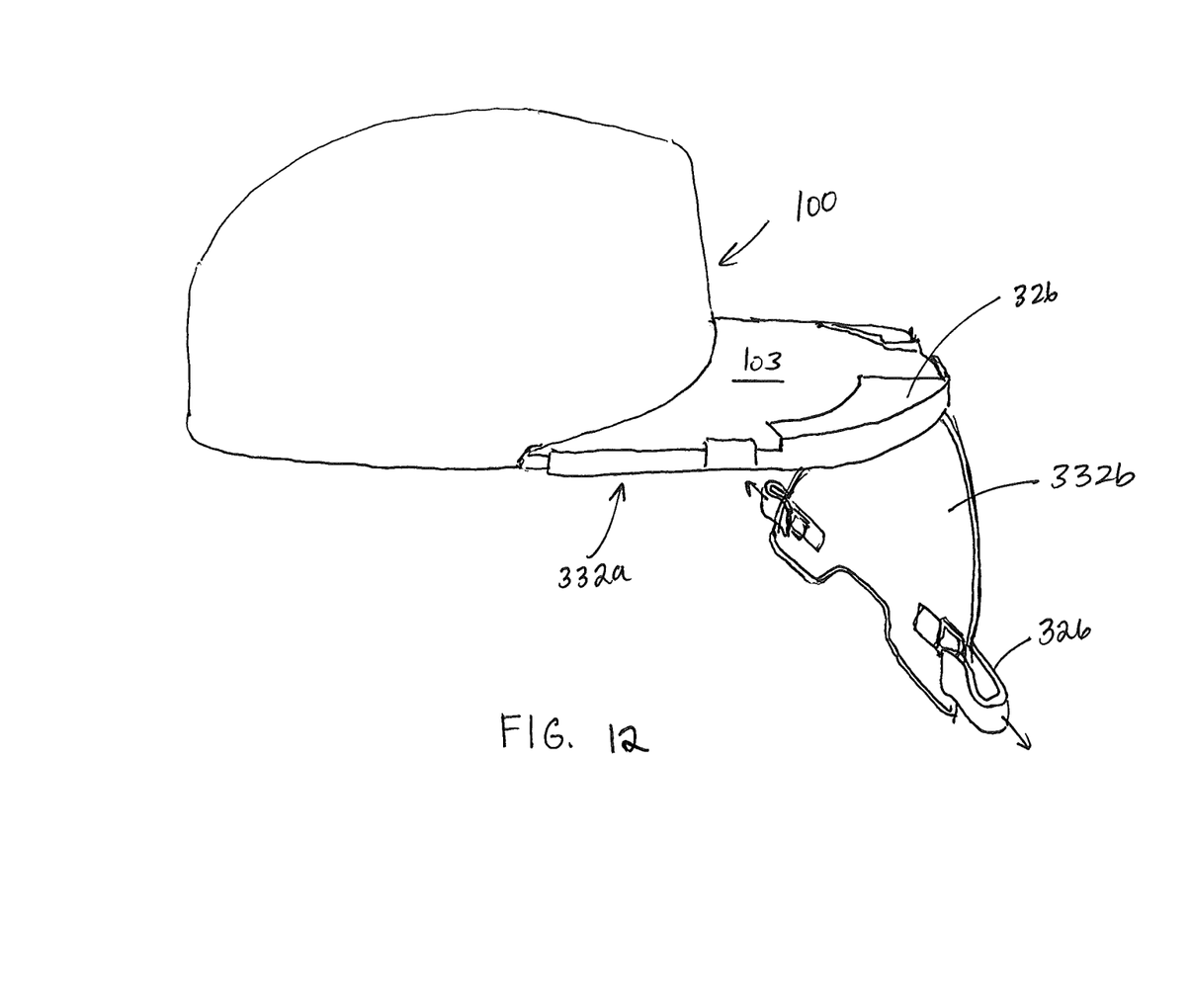
FIG. 12 is a perspective view of an item of headwear incorporating the hat pocket of FIG. 11.

Referring now to FIGS. 11-12, in still another embodiment, a hat pocket 320 may be configured from a single integral construction having a top portion 322a hingedly connected to a bottom portion 322b. The top and bottom portions 322a and 322b, respectively, may be constructed to have a shape and size substantially similar to that of the bill 103 of a hat 100. A hinge 330 may be formed between the top and bottom portions 322a and 322b such that the bottom portion 322b is rotatable relative to the top portion 322a when the top portion 322a is secured to the bill 103 of the hat 100 as described below. The hinge 330 may be, for example, an indentation in the material forming the top and bottom portions 322a and 322b which may allow the top and bottom portions 322a and 322b to be rotatable relative to each other.

The top portion 322a may include one or more fasteners 326 (e.g., clips, hooks, clasps, etc.), which may clip or otherwise hook around the edge of the bill 103 to secure the pocket 320 to the bill 103. The fasteners 326 may be provided at any one or more locations along the sides of the top portion 322a. When the fasteners 326 are secured around the edge of the bill 103, the top portion 322a is held into contact with the bottom face of the bill 103.

The bottom portion 322b may additionally include fasteners 326 (e.g., clips, hooks, claps, snaps, etc.) for securing the bottom potion 332b in a closed position. The fasteners 326 may likewise be located at any one or more locations along the sides, and preferably near the back of the bottom portion 322b. It shall be understood by those of skill in the art that corresponding snaps or other fastening mechanisms may be further provided at the top portion 322a, as necessary.

To secure the pocket 320 to the hat 100, the top portion 322a may be placed substantially adjacent the underside of the bill 100 and secured into place via the fasteners 326. The bottom portion 322b may then be rotated upwards and secured into place via snaps (or other fastening mechanism), thereby moving the pocket 320 into a closed position. To open the pocket 320, the bottom portion 322b may be unsnapped (or otherwise unfastened) from the top portion 322a and rotated away from the top portion 322a. Items may then be placed in the pocket 320. The bottom portion 322b may then be rotated back into the closed position, the fastening mechanism being used to secure the bottom portion 322b in the closed position. In one embodiment, a hat may be equipped with a pocket, such as one of the pockets described herein. The pocket may be configured to hold both personal items, such as a drivers' license or cash, as well as a power source that may be used to power items within close proximity to the wearer of the hat.

In one embodiment, the hat and/or bill may contain a variety of components such as a battery, central processing unit (CPU), random-access memory (RAM), communication, mixed-mode video processing circuitry, and human interface device (HID) drivers contained in hardware and/or software that optionally connects to extremely lightweight and streamline designed HID devices such as eye glasses, earphones, EEG bio-monitor interface devices, drop-down panels (such as that described herein), and other human sensory and response subsystems. One example of an HID interface, which could be used as an input and/or output device, may be a mouth retainer having input/output capabilities. Tongue movements can track intended user movements, similar to a touchpad, while stimulus feedback can be provided in the form of smell, taste, or tactile feedback.

The HID control and power circuitry may be contained within the hat and/or bill to provide power, communication, and functionality through wireless means such as infrared communication modulation, laser power delivery, and optical power transfer including visual and other wavelengths. Extremely small and embedded display, audio, and neurological interface elements can be encapsulated within HID glasses, jewelry, drop-down screens, etc. in order to create a functional system utilizing the placement of the bulky instrumentation, power, and communication technology components localized to the bill of the hat. The intended uses of the HID devices would be seamless and natural to their passive equivalents. For example, an HID eyeglass would look and function almost identically to a normal pair of eyeglasses with similar weight distributed on the user's nose for balance and support. In this example, the screen may be oLED, LCD, or other non-projected screen driven as a monitor device within the HID glasses.

In an embodiment, a hat may be configured as a communication portal for electronic communication between various devices and subsystems. The hat may further provide a mechanism for providing power to various systems and subsystems.

There are currently many items on the market that are "wireless." However, these items often require a battery source, which can be unsightly or inconvenient. For example, wireless earphones are commonplace, yet these often require a battery source that is worn around the user's neck which provides the necessary power. Virtual reality systems are also becoming more popular. These systems are presented as goggles with are secured around the user's head. These goggles are often very large and heavy, due at least in part to the power requirements of the system.

In one embodiment of the invention, a hat may be configured to provide low voltage power to systems that are in close proximity to the hat. The hat may be equipped with a battery having transmitter which may be configured to send low voltage signals to be received by receivers incorporated into various systems and subsystems, which convert the signal to energy. In one embodiment, the battery may transmit radio signals which the receiver converts to energy. In another embodiment, the hat may be equipped with an induction coil and a battery which together create an alternating electromagnetic field. An induction coil in a respective near-field system or subsystem may take power from the electromagnetic field and convert it to electrical energy.

The battery may be replaceable, or it may alternatively be chargeable. For example, a chargeable battery may require that it be plugged in once the battery is depleted. Alternately, the hat may be equipped with solar sheets which may receive light which may be used to recharge the battery.

It is envisioned that many devices may benefit from such an external battery source. For example, cell phones batteries are known for their suboptimal battery life. Accordingly, a cell phone having a receiver or induction coil may be recharged simply by carrying the phone in a pocket or purse that is in close proximity to the hat. Devices such as earbuds, virtual reality goggles, and other energy-requiring gadgets may be configured to receive wireless power and convert it into energy.

Figure 13A:
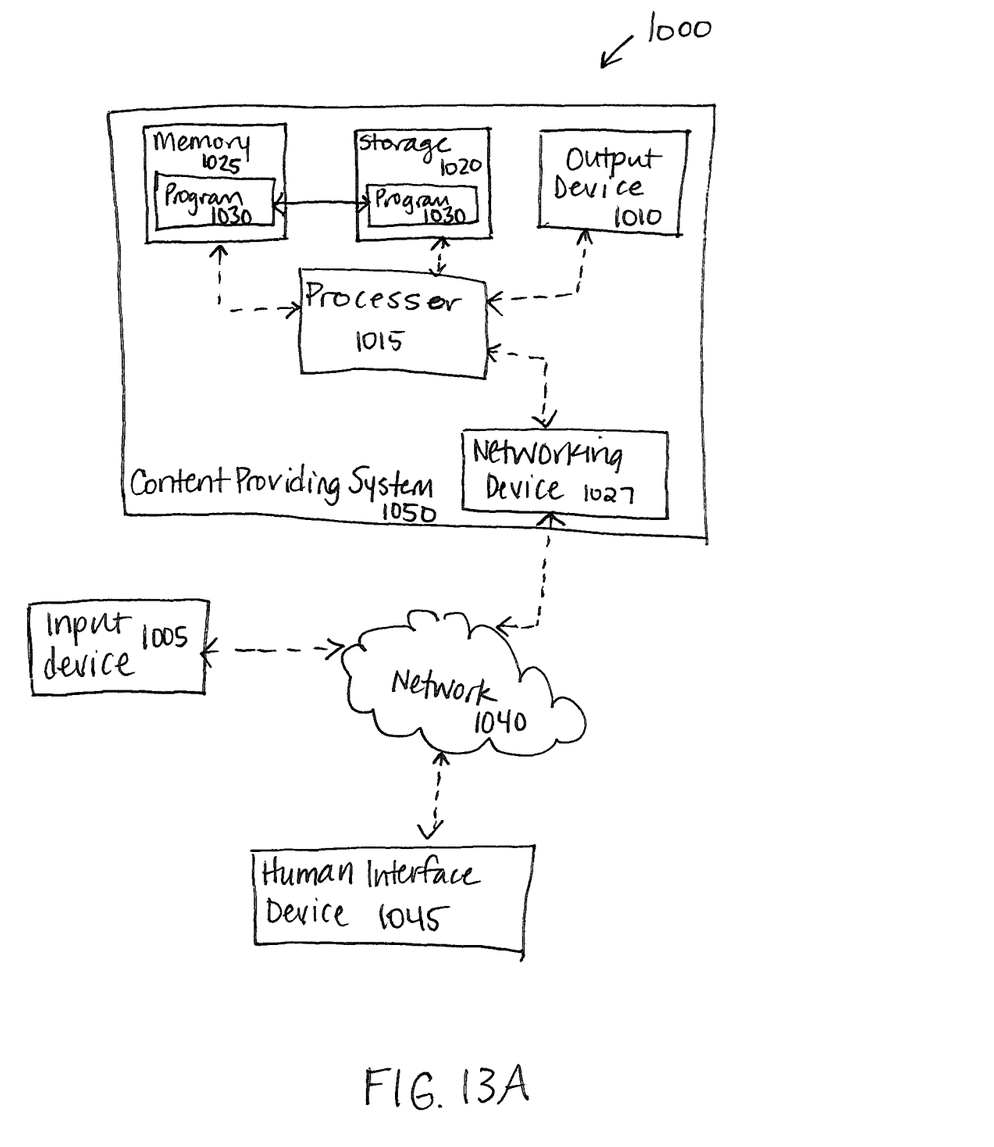
FIGS. 13A, 13B, and 13C show schematics illustrating embodiments of electronic communications between various components of an information portal communications system for providing information to a user of a human interface device incorporated into an item of headwear.
Figure 13B:
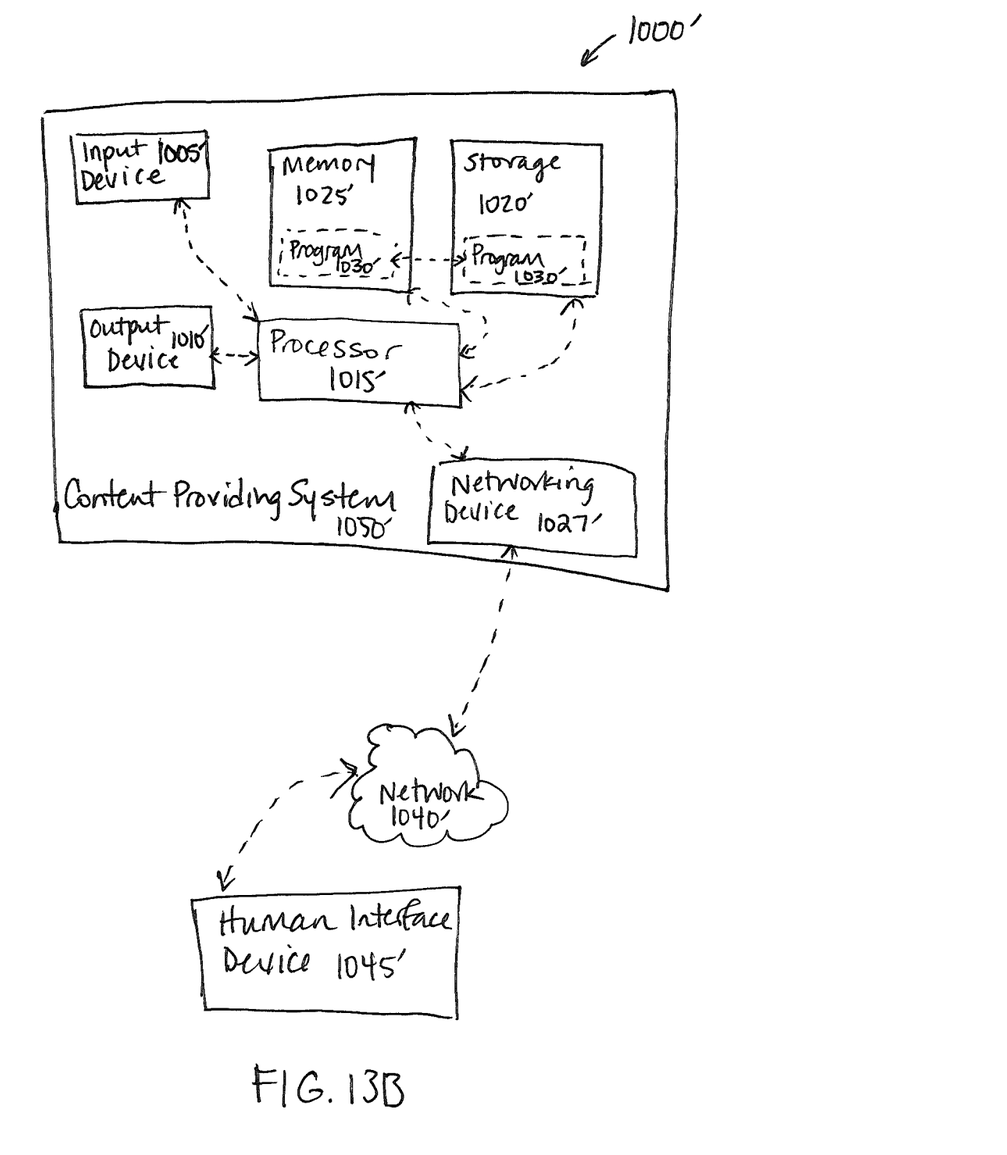
Figure 13C:
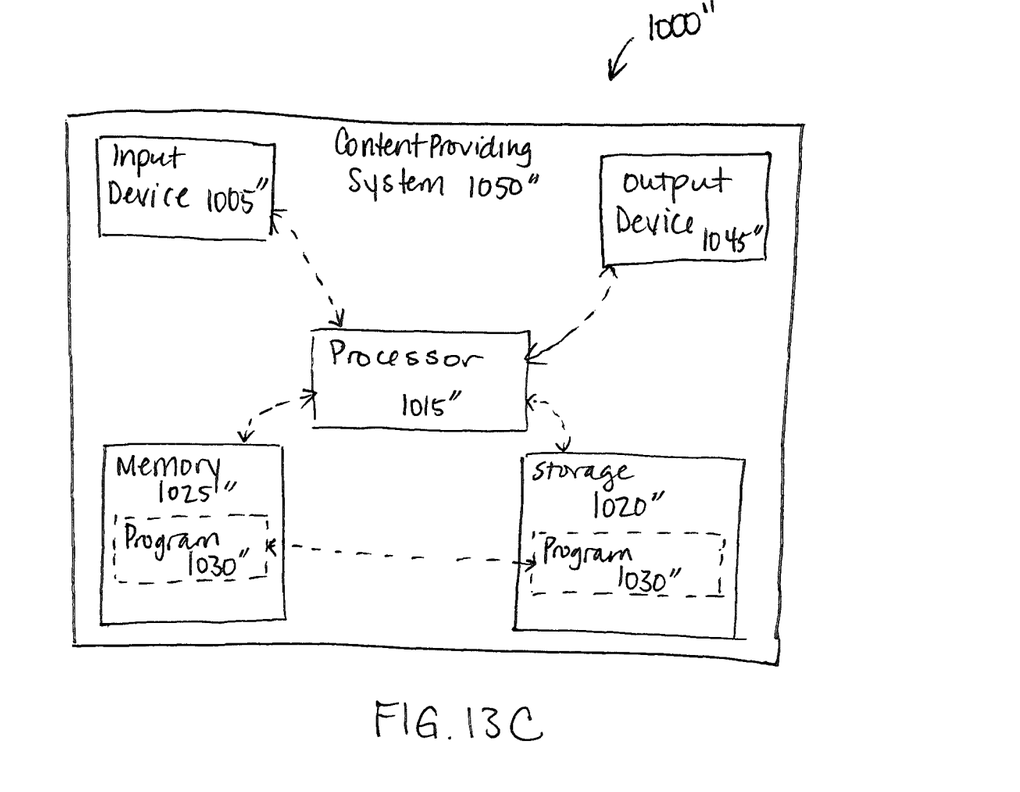

In another embodiment, the hat may include an information portal which may be configured to communicate with remote devices worn by the user. FIGS. 13A, 13B, and 13C show schematics illustrating embodiments of an information portal 1000. Each of the information portals 1000 include an input device 1005, and an output device 1010, which may be in communication with a processor 1015 capable of performing the desired functions. The portal 1000 may also include a storage unit 1020, computer memory 1025, and a networking device 1027, each of which may also be in data communication with the processor 1015, and a program 1030. The content providing system 1050 may be configured to communicate, e.g., wirelessly, over a network 1040. A human interface device 1045, such as those described herein, may be further configured to communicate with the content providing system 1050 over the network 1040.

Components of the information portal 1000 may be very small such that they fit, for example, on the bill 103 of an item of headwear 100. As described below, various components of the information portal 1000 may form a part of a content providing system 1050, or may be separate from the content providing system 1050 but may be in communication (e.g., wireless or wired communication) with the content providing system 1050.

FIG. 13A illustrates a schematic wherein the input device 1005 is separate from the content providing system 1050. Here, the input device 1005 may include, for example, a mobile device, which may communicate information to the content providing system 1050 over the network 1040, which may then be processed (e.g., via the processor 1015 in conjunction with the programming 1030) and communicated to the user via the output device 1010. For example, the information portal 1000 may further comprise a projector (example of an output device 1010) which may project the information from the input device 1005 (for purposes of discussion, a media file comprising a video) onto eyewear similar to a heads-up display (an example of a human interface device 1045). In one embodiment, the output device 1010 may include flashlights to provide lights when the input device 1005 (a light sensor) senses that the light in the area is low.

Heads-up displays are well-known for presenting data transparently without requiring a user to look away from the usual viewpoint. The projection unit in most heads-up displays is an optical collimator setup which includes convex lens or concave mirror with a Cathode Ray Tube, light emitting diode, or liquid crystal display at its focus. The combiner is typically an angled flat piece of glass (a beam splitter) located directly in front of the viewer, which redirects the projected image from the projector in such a way as to see the field of view and the projected infinity image at the same time. Combiners may have special coatings that reflect the monochromatic light projected onto it from the projector unit while allowing all other wavelengths of light to pass through. In some optical layouts combiners may also have a curved surface to refocus the image from the projector. The computer provides the interface between the heads-up display (i.e. the projection unit) and the systems/data to be displayed and generates the information displayed by the projection unit.

Here, the projector may be on a much smaller scale than is used in typical heads-up displays. The projector may be located somewhere along the bill 103 of the hat 100 (e.g., at an underside), and likely somewhere near the back of the bill 103 (e.g., close to the wearer's head). The eyewear here acts as the combiner. The video may thus be communicated from the input device 1005 to the wearer's eyewear 1045, without requiring the user to look down at the input device. In another embodiment, the projector may receive media files (e.g., through an mp3 player, through wireless communication (e.g., Bluetooth or other wireless communicate now in use or later developed) from a device such as a smart phone, or other device) which it may then project onto the eyewear. For example, when the user receives a text message, the message may be projected onto the eyewear. Or, in another example, a video feed may be projected onto the eyewear such that the user can participate in a video conference with third parties without the need to hold the phone. Here, it may be desirable for an additional input device 1005', such as a video recorder, to be located at the item of headwear 100 to take video of the user and to communicate that video (e.g., wirelessly) to the other members of the video conference 1045' (such as is illustrated via the schematic shown in FIG. 13B).

In another embodiment 1000', the item of headwear 100 may equipped with various sensors (i.e., input devices 1005'), which may be located anywhere on the item of headwear, for sensing and relaying information regarding the environment of the wearer, or other information, such as video feeds, sound feeds, etc. The sensors, together with the programming 1030', may be configured to sense, record, and analyze data in real time to provide relevant information to the user.

For example, sensors in the hat may sense when a user is outdoors (e.g., though a temperature differential identified by one or more of the sensor) and may receive input information related to the various environmental conditions such as temperature, humidity, etc. The programming 1030' may take the input information and analyze it to present to the user's eyewear (example of a human interface device 1045', vis-à-vis a projector (example of an output device 1010'). The programming 1030' may be programmable by the user to take into account the user's preferences (which may be input via an input device (not shown). For example, the user may only want temperature information, although humidity information may also be determined via the sensor. It may be desirable for at least some of the information presented to the user to be based on the input information received from the input device 1005'.

According to another example, the sensors 1005' may include retinal scanners which are well known in the art. The retinal scanners 1005' may be located, for example, on the bill of the item of headwear, and may be configured to determine a path of eyesight of the user of the item of headwear. Upon determination of the line of sight of the user, the scanners 1005' may be configured to send a signal (e.g., over the network 1040'). The signal may be received by a nearby device (which may be a human interface device 1045', or may be another output device, such as a television, radio, etc.) to operate the device. To illustrate, the retinal scanner 1005' may determine that the user is looking at the television, which may be in a "sleep" mode for conserving energy. The scanner 1005' may send a signal to the television, alerting the television that the user is looking at it. The television may then be turned into an "active" mode so that the user can watch it. The scanner 1005' may continuously (e.g., in increments of, 1 minute, 2 minutes, 5 minutes, etc.) monitor the user's line of sight, such that when the scanner 1005' determines that the user is no longer looking at the television, it returns to the "sleep" mode. While reference is made herein to televisions, it shall be understood that the retinal scanners may be used in conjunction with any of a number of devices that are capable of receiving signals for operation thereof.

In a further example 1000", illustrated in FIG. 13C, the input device 1005" and the output device 1045" (which in this embodiment may be the human interface device) may form a part of the content providing system 1050". The input device 1005" may be, for example, a media file stored in the content providing system storage 1020', such as a sound file. The output device 1045" may include speakers and/or headphones. The processor 1015" may cause the media file to be played on the speakers 1045" which may be located somewhere on the item of headwear 100.

In still another example, an input device 1005 may be a sensor configured to determine one or more characteristics of a food item. When the sensor detects a particular food item, the sensor may communicate (e.g., over a network) with a database to retrieve information, such as relevant nutritional information, about the food item. The information may then be presented to the user, e.g., via the output device 1045. In embodiments, the sensor 1005 may be configured to directly determine nutritional information about the food item, which may then be presented to the user via the output device 1045. Optionally, the sensor 1005 may be configured to communicate, e.g., over a network, to present information to a user's mobile device. For example, a person may be communicating with a doctor to monitor his or her health. As the user consumes a food item, information about the food item can be shown to the user (as described above) and may further be sent to the doctor. The information may be temporarily or permanently stored in a database.

Reference made herein to specific types of input devices 1005, 1005', and 1005" are meant to be exemplary in nature only, and shall not be limiting. In another example, the input devices 1005, 1005' and/or 1005" may be biological monitors which may measure certain desirable information about the user of the item of headwear. The input device 1005, 1005', and/or 1005" may thus take the form of temperature sensors (e.g., infrared thermometer for inferring the temperature of a user from the thermal radiation coming from the user's forehead), brain sensors (e.g., EEG sensors, accelerometers, and other wearable sensors) may provide information related to the user's neurological function. This may be especially beneficial for persons who suffer from neurological disorders, which may be easily monitored without requiring unpleasant and onerous equipment.

The biosensors may additionally be in data communication with the other components of the item of headwear. For example, as described above, the bladder 105 may be equipped with a valve 107 which may be configured to pull in air from the wearer's surroundings in order to automatically inflate. In embodiments, a sensor (e.g., an accelerometer) may sense that the wearer is experiencing a fall, and may communicate with the bladder 105 and the valve 107 such that the bladder 105 is automatically inflated in order to prevent or minimize harm to the wearer.

In one embodiment, a user may not desire to wear glasses. The item of headwear may thus be equipped with a drop-down screen, which may be hingedly connected to the end of the bill of a hat such that it may be rotated into a "view" position when the user wishes to receive information, and rotated out of sight when not in use. In an embodiment, the drop-down screen may be substantially similar to the pocket described above regarding FIGS. 11 and 12. Here, however, the second panel 322b may instead function as a drop-down screen. It may be desirable for the drop-down screen to be at least partially transparent. The drop-down screen may thus stand alone.

It shall be noted that the screen may also be in addition to a hat pocket. In other words, in an example, referring again to FIGS. 11 and 12, a third panel (which is not shown in FIGS. 11 and 12), may be provided under the second panel 322b which may function as the drop-down screen. The drop down screen may be rotatably connected to the second panel 322b, and a friction fit between the second and third panels may allow the user to adjust the drop-down screen into the desired viewing position without disturbing the second panel 322b.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

The invention claimed is:

1. An item of headwear, comprising:
   a crown forming a band having an inside surface, and an inflatable bladder secured adjacent to the inside surface;
   wherein:
      in a non-use configuration, the bladder lays substantially flat against the band; and
      in a use configuration, the bladder inflates to form a soft surface to support a user's head when worn around the user's neck; and
      the bladder is selectively removable from the band.

2. The item of headwear of claim 1, wherein the item of headwear further includes a bill extending outwardly from the crown; and wherein the bill further includes a pocket comprising a panel and an elastic band fixed to the pocket, the panel having a shape and size substantially similar to the bill, wherein the panel is placed adjacent the bill and the elastic band is stretched around an edge of the bill to secure the pocket to the bill.

3. The item of headwear of claim 1, wherein the item of headwear further includes a bill extending outwardly from the crown; and wherein the bill further includes an accessory comprising an first panel and a second panel hingedly connected to the first panel, the first and second panels each having a shape and size substantially similar to the bill, wherein the first panel comprises an envelope portion for receiving the bill, and the second panel is rotatable between an open and closed position, the second panel being detachably joined to the first panel in the closed position.

4. The item of headwear of claim 2, wherein the crown further includes a pouch.

5. The item of headwear of claim 3, wherein the crown further includes a pouch.

6. The item of headwear of claim 3, further comprising a battery having a transmitter, the battery transmitter configured to wirelessly transmit low voltage signals which are received by a receiver in a receiving device, the receiver being configured to convert the low voltage signal into usable energy.

7. The item of headwear of claim 3, further comprising an information portal comprising an input device, a human interface device, and a content providing system, the content providing system comprising:
   non-transitory computer memory having a program with instructions for:
      receiving information from the input device; and
      relaying the information to the human interface device;
   a processor;
   an output device; and
   a networking device;
   wherein a battery provided as part of the item of headwear provides power to the information portal; and
   wherein the input is a biosensor.

8. The item of headwear of claim 7, wherein the program further includes instructions for:
   analyzing said input information; and
   developing user display information, the user display information being at least partially based on the input information; and
   relaying the user display information to the human interface device.

9. The item of headwear of claim 7, wherein the human interface device is the accessory, the second panel being configured to receive the user display information from the output device when in an open position; wherein the output device is a projector; and
   wherein the second panel is at least partially transparent.

10. An item of headwear, comprising:
    a hat having a crown; and
    a self-inflatable bladder secured to the crown;
    a sensor secured to the hat;
    a memory storing computer-readable instructions; and
    a processor configured to execute instructions to:
    (a) obtain a reading from the sensor; and
    (b) inflate the self-inflatable bladder upon determining that the reading from the sensor reached a predetermined threshold.

11. An item of headwear, comprising:
    a bill, comprising a pocket, the pocket comprising:
       a first panel; and
       a second panel hingedly connected to the first panel;
       wherein:
          the first and second panels are sized and shaped substantially similar to the bill;
          the first panel is removably secured to the bill; and
          the second panel is rotatable between an open and a closed position;
    a battery; and
    an information portal, comprising:
       an input device;
       a human interface device; and
       a content providing system, the content providing system comprising:
          non-transitory computer memory having a program with instructions for:
             receiving information from the input device; and relaying the information to the human interface device;
a processor;
an output device; and
a networking device.

12. The item of headwear of claim 11, wherein the human interface device is a pair of glasses having lenses configured to receive the information from the output device; wherein the output device is a projector.

13. The item of headwear of claim 12, wherein the input device is at least one of a mobile device and a sensor; and wherein the input device wirelessly transmits information over a network to the content providing system, the content providing system subsequently relaying the information to the human interface device via the output device.

14. The item of headwear of claim 11, wherein at least the second panel is flexible, the pocket thereby being configured to hold personal items.

15. The item of headwear of claim 11, wherein the pocket further comprises a third panel, the third panel being rotatably connected to the second panel;
wherein:
the third panel is the human interface device and is configured to receive the information from the output device when in an open position;
the third panel is at least partially transparent; and
a friction fit between the second and third panels maintains the third panel in the desired position.

16. The item of headwear of claim 11, wherein the item of headwear comprises a headband, the headband having an inflatable bladder; and wherein:
in a non-use configuration the bladder lays substantially flat against the headband; and
in a use configuration, the bladder inflates to form a soft surface to support a user's head when worn around the user's neck.

17. The item of headwear of claim 16, wherein:
the item of headwear further includes a bill extending outwardly from the headband;
the bill further includes a pocket comprising a panel and an elastic band fixed to the pocket, the panel having a shape and size substantially similar to the bill;
the panel is placed adjacent the bill and the elastic band is stretched around an edge of the bill to secure the pocket to the bill in a closed position;
the elastic band is folded back around a portion of the edge of the bill to open the pocket.

18. An item of headwear, comprising:
a headband, and an inflatable bladder, the inflatable bladder being secured adjacent a side of the headband closet to a user's head when worn;
a battery; and
an information portal comprising an input device, a human interface device, and a content providing system, the content providing system comprising:
non-transitory computer memory having a program with instructions for:
receiving information from the input device; and
relaying the information to the human interface device;
a processor;
an output device; and
a networking device.

* * * * *